(12) United States Patent
Takahashi et al.

(10) Patent No.: US 9,829,985 B2
(45) Date of Patent: Nov. 28, 2017

(54) INPUT DEVICE AND OPERATION DEVICE FOR VEHICLE

(71) Applicant: ALPS ELECTRIC CO., LTD., Tokyo (JP)

(72) Inventors: Akihiro Takahashi, Miyagi-ken (JP); Ikuyasu Miyako, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/602,066

(22) Filed: Jan. 21, 2015

(65) Prior Publication Data

US 2015/0259000 A1 Sep. 17, 2015

(30) Foreign Application Priority Data

Mar. 12, 2014 (JP) ................................ 2014-049267

(51) Int. Cl.

| | |
|---|---|
| *B60T 8/172* | (2006.01) |
| *G07C 5/08* | (2006.01) |
| *B60R 16/023* | (2006.01) |
| *G06F 3/01* | (2006.01) |
| *B60K 37/06* | (2006.01) |
| *G06F 3/0488* | (2013.01) |
| *G06F 3/0354* | (2013.01) |

(52) U.S. Cl.
CPC ............. *G06F 3/017* (2013.01); *B60K 37/06* (2013.01); *G06F 3/03547* (2013.01); *G06F 3/04883* (2013.01); *B60K 2350/1024* (2013.01); *B60K 2350/1052* (2013.01)

(58) Field of Classification Search
None
See application file for complete search history.

(56) References Cited

U.S. PATENT DOCUMENTS

| | | | |
|---|---|---|---|
| 6,256,370 B1 * | 7/2001 | Yavuz | G01N 23/046 378/22 |
| 7,961,173 B2 * | 6/2011 | Boillot | G06F 3/017 345/158 |
| 2007/0156259 A1 * | 7/2007 | Baramov | G05B 13/048 700/44 |

(Continued)

FOREIGN PATENT DOCUMENTS

| | | | |
|---|---|---|---|
| DE | 20309603 | * | 9/2003 |
| JP | 2012-128864 | | 7/2012 |

(Continued)

OTHER PUBLICATIONS

Office Action for Japanese Application No. 2014-049267 dated Aug. 1, 2017.

*Primary Examiner* — Jean-Paul Cass
(74) *Attorney, Agent, or Firm* — Beyer Law Group LLP (57) ABSTRACT

An input device includes an input unit on which an operator performs a predetermined operation to perform input, a storage unit that stores a reference range set on a virtual coordinate, a control unit that identifies the operation of the operator based on a trajectory of the operation performed on the input unit by the operator and the reference range, a determination unit that determines whether the trajectory of the operation of the operator exceeds the reference range, and a range setting unit that updates the reference range based on a determination result of the determination unit.

9 Claims, 5 Drawing Sheets

(56) References Cited

U.S. PATENT DOCUMENTS

| | | | |
|---|---|---|---|
| 2010/0033352 A1* | 2/2010 | Chuang | G06F 3/017 341/20 |
| 2010/0185341 A1* | 7/2010 | Wilson | B60R 25/2045 701/1 |
| 2011/0178705 A1* | 7/2011 | Pakzad | G01C 21/20 701/533 |
| 2013/0166787 A1 | 6/2013 | Ohta | |
| 2014/0132562 A1* | 5/2014 | Miyamoto | G06F 3/0418 345/174 |
| 2014/0292652 A1 | 10/2014 | Imai | |
| 2014/0300560 A1* | 10/2014 | An | G06F 3/0488 345/173 |
| 2015/0324025 A1* | 11/2015 | Shin | G06F 3/041 345/173 |

FOREIGN PATENT DOCUMENTS

| | | | |
|---|---|---|---|
| JP | 2013-112207 | | 6/2013 |
| WO | WO2011026763 | * | 3/2011 |

* cited by examiner

INPUT DEVICE AND OPERATION DEVICE FOR VEHICLE

CLAIM OF PRIORITY

This application claims benefit of Japanese Patent Application No. 2014-049267 filed on Mar. 12, 2014, which is hereby incorporated by reference.

BACKGROUND OF THE INVENTION

1. Field of the Invention

The present invention relates to an input device in which an input is performed based on a trajectory of an operation of an operator, and an operation device for a vehicle including this input device.

2. Description of the Related Art

An operation device for a vehicle has been proposed in which a capacitive touch pad is provided in a steering wheel of a vehicle, and an input unit is included that detects an operation which is performed on this touch pad by a vehicle driver. When an input operation is performed on the touch pad of this operation device for a vehicle during driving of the vehicle, this input operation is an operation that occurs in a state in which the steering wheel is gripped, and thus for example, even when a linear gesture is performed, this gesture follows an arc-shaped trajectory with a root part of the thumb being a fulcrum. Therefore, false gesture detection, or a case in which the gesture cannot be detected occurs.

In contrast, in an operation device for a vehicle described in Japanese Unexamined Patent Application Publication No. 2013-112207, an arc-shaped gesture is judged to be a linear gesture as long as the trajectory of an operation of a vehicle driver does not exceed a predetermined width.

However, a fulcrum position of the trajectory of a touch pad operation or a shape of drawing the trajectory is different from vehicle driver to vehicle driver due to the physical features of the respective vehicle drivers such as finger length or arm length, a habit of the vehicle driver, or a gripping position of the steering wheel. Further, drawing a different trajectory in each driving opportunity of the same vehicle driver is considered. This is similar to a case in which the touch pad is arranged in a position (for example, a console) other than the steering wheel.

Therefore, in some vehicle drivers or some driving opportunities, the trajectory of an operation may exceed a predetermined width and it may be difficult for a gesture to be recognized as a linear gesture. In this case, because a desired instruction cannot be sent to the vehicle, an operation of the vehicle may interfere and this is not preferable. Further, in the operation device for a vehicle described in Japanese Unexamined Patent Application Publication No. 2013-112207, since it is necessary to determine whether the width of an arc of the trajectory is out of a threshold range for all operations, the load on a processing system increases.

SUMMARY OF THE INVENTION

Therefore, the present invention provides an input device and an operation device for a vehicle capable of correctly detecting a gesture of an operation regardless of a physical feature, a habit, or the like of an operator. Further, the present invention provides an input device and an operation device for a vehicle in which the load on a processing system is small.

According to an aspect of the present invention, there is provided an input device including: an input unit on which an operator performs a predetermined operation to perform input; a storage unit configured to store a reference range set on a virtual coordinate; a control unit configured to identify the operation of the operator based on the trajectory of the operation performed on the input unit by the operator and the reference range; a determination unit configured to determine whether the trajectory of the operation of the operator exceeds the reference range; and a range setting unit configured to update the reference range based on a determination result of the determination unit.

By updating the reference range when the trajectory of the operation exceeds the reference range, it is possible to set the reference range according to an operation trajectory which has changed due to a physical feature or the like of the operator each time the operator changes, and thus, to correctly recognize the gesture of the operation.

In the input device according to an aspect of the present invention, it is preferable for the determination of the determination unit to include a first determination performed at the time of start-up of the input device.

In the input device according to an aspect of the present invention, it is preferable for the first determination to be performed based on the trajectory of the operation performed by the operator for an operation designated by the control unit.

By performing the first determination at the time of start-up of the input device, the trajectory is less likely to exceed the reference range and the determination range for subsequent operations, the gesture can be correctly recognized, and the load on the system when updating the reference range and the determination range can be reduced.

In the input device according to an aspect of the present invention, it is preferable that the input unit includes a switch that the operator operates by coming in contact with or pressing the input unit, and the determination of the determination unit includes a second determination performed based on the trajectory of an operation performed directly before the operation of the switch.

In the input device according to an aspect of the present invention, it is preferable for the range setting unit to update the reference range based on an average value of a predetermined number of second determinations.

This is because, by using an average value of a plurality of operations, it is easy to reflect a physical feature or a habit of the operator, except for a special situation.

It is possible to identify the gesture more exactly by performing the determination based on a plurality of operations after start-up of the input device.

In the input device according to an aspect of the present invention, it is preferable that the storage unit stores a determination range which is wider than the reference range, as well as the reference range, the determination unit determines whether the trajectory of the operation of the operator exceeds the determination range, and the range setting unit updates the determination range based on a result of determination as to whether the trajectory of the operation of the operator exceeds the determination range.

In the input device according to an aspect of the present invention, it is preferable for the range setting unit to reset the reference range and the determination range and update the reference range and the determination range with an initial reference range and an initial determination range at the time of start-up of the input device.

In the input device according to an aspect of the present invention, it is preferable that the range setting unit resets the reference range and the determination range to update the reference range and the determination range with an initial reference range and an initial determination range when there is no updating of the reference range over predetermined time during the start-up of the input device.

This is because an operator is likely to change before the subsequent operation occurs or the trajectory of the operation is likely to be changed due to fatigue of the operator or the like when there is no operation for a long period of time.

In the input device according to an aspect of the present invention, it is preferable that the storage unit stores a last reference range and a last determination range associated with each operator, and the range setting unit reads a corresponding last reference range and a corresponding last determination range from the storage unit according to identification information of the operator designated by the operation of the switch, and updates the reference range and the determination range with the corresponding last reference range and the corresponding last determination range.

Accordingly, it is possible to reduce the load on the system since the determination and updating of processes can be simplified.

According to another aspect of the present invention, there is provided an operation device for a vehicle, in which any one of the above-described input devices is arranged in a steering wheel or a console of the vehicle, and the control unit outputs a control signal to the vehicle based on the identification result.

According to the input device and the operation device for a vehicle according to an aspect of the present invention, it is possible to correctly identify a gesture of an operation regardless of a physical feature, a habit, or the like of the operator and to reduce the load on a processing system according to a determination and a range setting.

DESCRIPTION OF THE PREFERRED EMBODIMENTS

Hereinafter, an input device according to an embodiment of the present invention will be described in detail with reference to the drawings.

Figure 1:
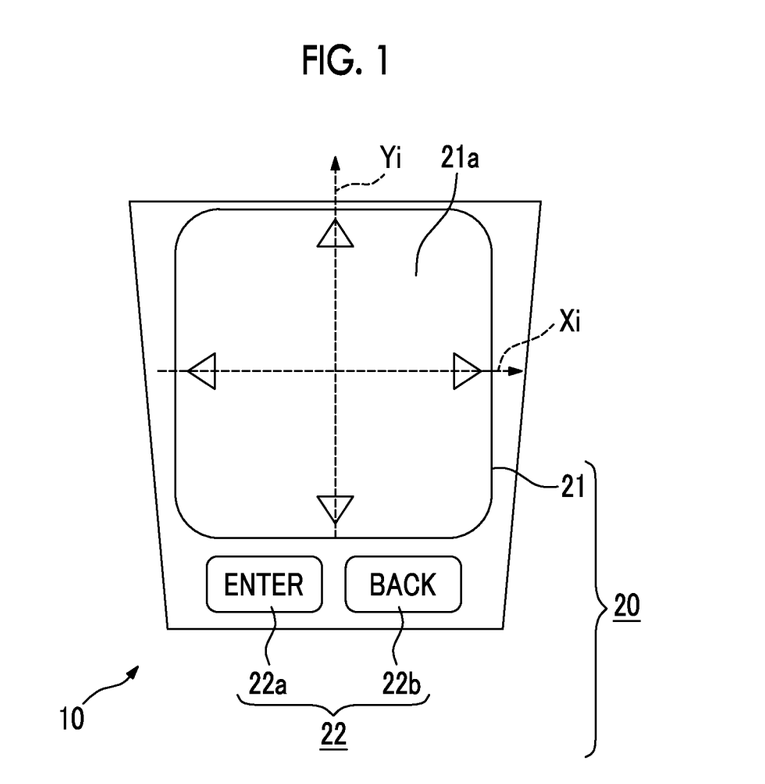
FIG. 1 is a plan view illustrating a configuration of an input device according to an embodiment of the present invention.
Figure 2:
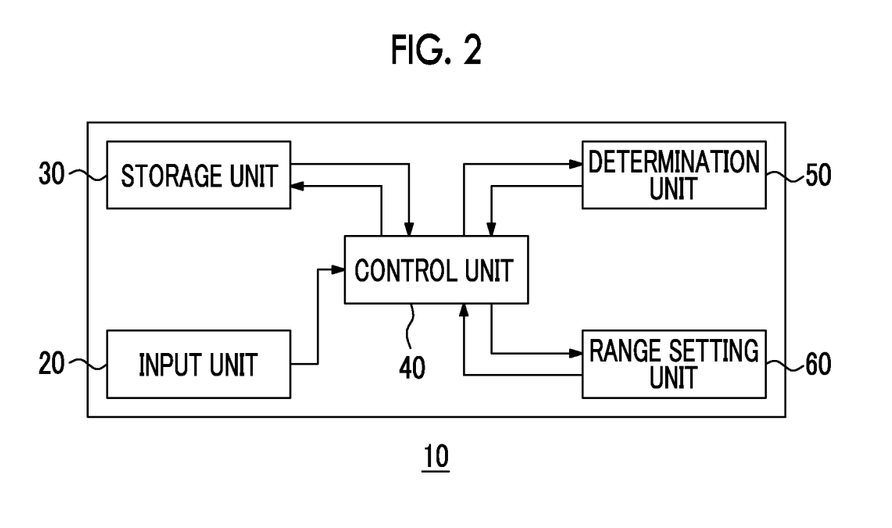
FIG. 2 is a block diagram illustrating a configuration of the input device according to the embodiment of the present invention.
Figure 3:
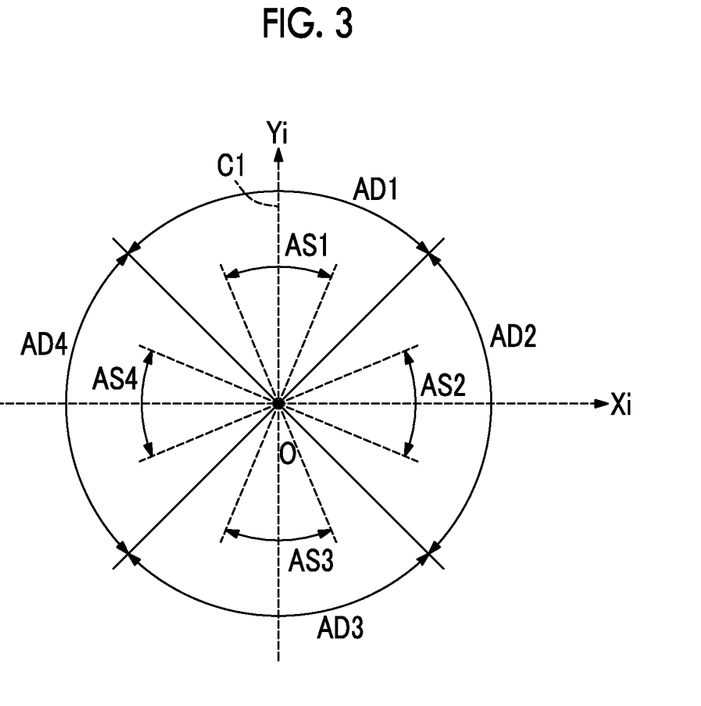
FIG. 3 is a diagram illustrating an example of a reference range and a determination range of a virtual coordinate in the input device according to the embodiment of the present invention.

FIG. 1 is a plan view illustrating a configuration of an input device 10 according to this embodiment. FIG. 2 is a block diagram illustrating a configuration of the input device 10. FIG. 3 is a diagram illustrating an example of a reference range and a determination range of a virtual coordinate in the input device 10. In FIG. 1, a virtual coordinate (a vertical axis Yi and a horizontal axis Xi) corresponding to FIG. 3 is shown on a touch pad 21.

The input device 10 includes an input unit 20 including a touch pad 21 and a switch 22, a storage unit 30, a control unit 40, a determination unit 50, and a range setting unit 60, as illustrated in FIG. 1 or 2.

The input unit 20 includes the touch pad 21 and the switch 22, and an operator of the input device 10 performs input by performing a predetermined operation. The touch pad 21 enables the operator to perform input by performing an operation with a predetermined trajectory on an input surface 21a. For example, a capacitive touch pad is used. In the touch pad 21, a virtual coordinate (a vertical axis Yi and a horizontal axis Xi) is set on the input surface 21a, as illustrated in FIG. 1. When a finger of the operator comes in contact with or approaches the input surface 21a, a coordinate on the virtual coordinate is detected based on a change in capacitance, and when the finger moves on the input surface 21a, the trajectory of the virtual coordinate is detected and stored in the storage unit 30.

The switch 22 includes two individual switches 22a and 22b and is used for inputting data into the input device 10, selection of a function, confirmation of the input by the touch pad 21, cancellation of an instruction, or the like, which is performed by the operator coming in contact with or approaching the switch.

The storage unit 30 is, for example, a semiconductor memory, and stores information regarding control of the storage unit 30, the determination unit 50, and the range setting unit 60, coordinate information corresponding to an operation performed by the operator, setting of a virtual coordinate with respect to the input surface 21a of the touch pad 21, a table indicating a relationship of a gesture and an instruction or a control signal, setting information for the reference range and the determination range, a calculation program for correcting the reference range and/or the determination range, identification information for identifying each operator, information regarding a last reference range and a last determination range for each operator, and the like. Here, the storage unit 30 individually stores an initial reference range and an initial determination range, and a last reference range and a last determination range to be updated at any time.

In the input device 10, the reference range and the determination range (initial reference range and initial determination range) are set and stored in the storage unit 30 at the time of manufacture. The initial reference range and the initial determination range are set on the virtual coordinate in which a vertical axis Yi and a horizontal axis Xi are orthogonal to each other, as illustrated in FIG. 3. Specifically, reference ranges AS1, AS2, AS3, and AS4 are set as the same angle ranges around the Yi axis or the Xi axis. Similarly, determination ranges AD1, AD2, AD3, and AD4 are set as the same angle ranges) (90° around the Yi axis or the Xi axis. The determination ranges AD1, AD2, AD3, and AD4 include the reference ranges AS1, AS2, AS3, and AS4, respectively, and are set as wider ranges than the respective reference ranges. The respective reference ranges and the respective determination ranges are used for determination of the following linear gestures.

(1) The reference range AS1 and the determination range AD1: an upward gesture (gesture in a positive direction of the vertical axis Yi)

(2) The reference range AS2 and the determination range AD2: a rightward gesture (gesture in a positive direction of horizontal axis Xi)

(3) The reference range AS3 and the determination range AD3: a downward gesture (gesture in a negative direction of the vertical axis Yi)

(4) The reference range AS4 and the determination range AD4: a leftward gesture (gesture in a negative direction of horizontal axis Xi)

In FIG. 3, an angle range of the reference range AS1 is defined by two boundary lines BS11 and BS12, and an angle range of the determination range AD1 is defined by two boundaries BD11 and BD12. The same applies to the other reference ranges AS2 to AS4 and the other determination ranges AD2 to AD4.

The control unit 40 not only controls the operation of the storage unit 30, the determination unit 50, and the range setting unit 60, but also identifies a gesture to which the operation of the operator corresponds based on the trajectory of the operation performed on the touch pad 21 by the operator, and the reference range. The input device 10 executes an operation, control, or the like that corresponds to the identified gesture according to a table stored in the storage unit 30.

The determination unit 50 is an operational circuit that determines whether the trajectory of the operation of the operator exceeds the reference range and the determination range. The determination unit 50 performs a determination using a program stored in the storage unit 30 in advance, and this determination includes a first determination performed at the time of start-up of the input device 10, and a second determination performed based on a trajectory of an operation performed on the touch pad 21 directly before or after an operation of the switch 22.

The range setting unit 60 corrects the reference range when the trajectory of the operation of the operator exceeds the reference range based on a determination result of the determination unit 50, and stores the reference range after correction in the storage unit 30. Further, the range setting unit 60 updates the determination range, similarly to the updating of the reference range, based on a result of the determination as to whether the trajectory of the operation of the operator exceeds the determination range. The determination range can be updated even in a state in which the trajectory of the operation of the operator does not exceed the determination range, but exceeds the reference range.

Hereinafter, the determination in the determination unit 50, and the correction and the updating of the reference range and determination range in the range setting unit 60 will be described.

Figure 4A:
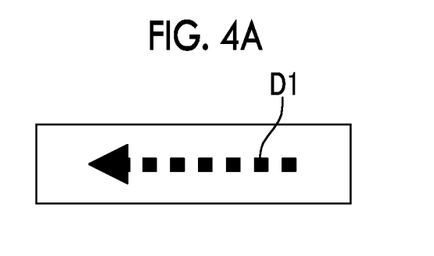
FIG. 4A is a diagram illustrating a gesture designated in a first determination.
Figure 4B:
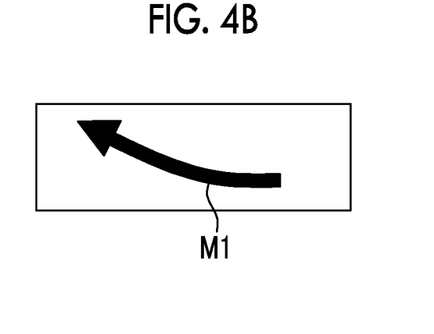
FIG. 4B is a diagram illustrating the trajectory of an operation of an operator of FIG. 4A.
Figure 5A:
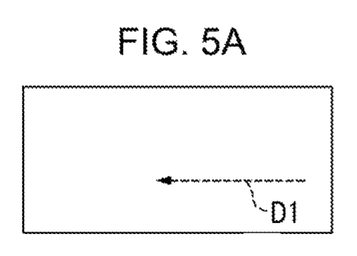
FIG. 5 is a diagram illustrating a determination line of FIG. 4A, as shown in box (a), a relationship between the determination line of box (a) and a straight line corresponding to the trajectory of an operation of an operator, as shown in box (b), an angle to be corrected based on box (b), as shown box (c), and a new determination line to which an angle illustrated in box (c) is applied, as shown in box (d)
Figure 5B:
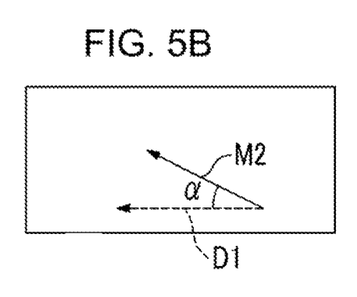
Figure 5C:
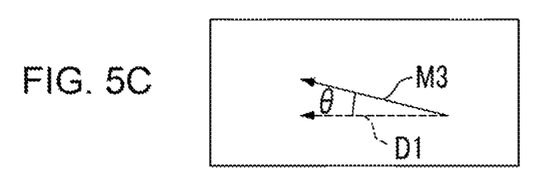
Figure 5D:
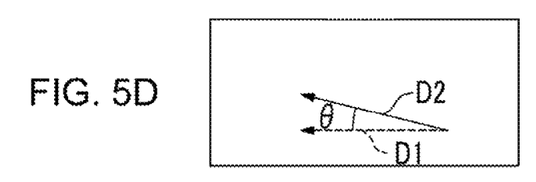

First, the first determination will be described with reference to FIGS. 4 and 5. FIG. 4A illustrates a gesture (determination line D1) designated in the first determination, and FIG. 4B is a diagram illustrating a trajectory M1 of an operation of an operator for FIG. 4A. FIG. 5 box (a) illustrates a determination line in FIG. 4A, FIG. 5, box (b) illustrates a relationship between the determination line in FIG. 5, box (a) and a straight line corresponding to the trajectory of the operation of the operator, FIG. 5, box (c) illustrates an angle to be corrected based on FIG. 5, box (b), and FIG. 5, box (d) illustrates a new determination line to which the angle illustrated in FIG. 5, box (c) is applied.

The first determination is a determination performed at the time of start-up of the input device 10, and is performed based on the trajectory of an operation performed by an operator for a gesture designated by the control unit 40. Here, the range setting unit resets the reference range and the determination range so as to update the reference range and the determination range with an initial reference range and an initial determination range at the time of start-up of the input device 10.

In the first determination, the operator is instructed to perform the gesture designated by the control unit 40 through sound or image display, and the gesture is shown by a linear trajectory D1 as illustrated in FIG. 4A (FIG. 5, box (a)). Here, the gesture designated by the control unit 40 is not limited to a leftward motion as illustrated in FIG. 4A, and any one of the gestures corresponding to the reference ranges AS1 to AS4 illustrated in FIG. 3 may also be used.

When the operation performed on the touch pad 21 by the operator in response to a designation of the gesture by the control unit 40, which is shown by a linear trajectory D1, is an arc-shaped trajectory M1 as illustrated in FIG. 4B, the determination is performed as follows.

First, the curved trajectory M1 (FIG. 4B) of the operation of the operator is replaced with, for example, a straight line M2 (FIG. 5, box (b)) connecting a start point and an end point in the virtual coordinate. The replacement with the straight line may be performed using other schemes.

When an angle α formed by the determination line D1 and the straight line M2 exceeds a predetermined angle, the determination unit 50 determines when the trajectory of the operation of the operator exceeds the reference range (the first determination). In this case, the range setting unit 60 calculates an angle θ (FIG. 5, box (c)) obtained by multiplying the angle α by a predetermined coefficient smaller than 1 as a correction value, and defines a straight line M3 forming the angle θ with respect to the determination line D1. Here, the "predetermined angle" used for determination of the angle α is, for example, ½ of an angle defined on the virtual coordinate by the reference range, and the coefficient by which the angle α is multiplied is, for example, 0.1.

The range setting unit 60 sets the straight line M3 defined as described above as a new determination line D2, corrects the reference range with a range obtained by rotating the reference range by the angle θ around an origin O of the virtual coordinate, and updates reference range data stored in the storage unit 30.

On the other hand, when the angle α is equal to or smaller than the predetermined angle, it is determined that the trajectory of the operation of the operator does not exceed the reference range, the range setting unit 60 does not calculate the correction value, and the reference range is not updated.

Figure 6:
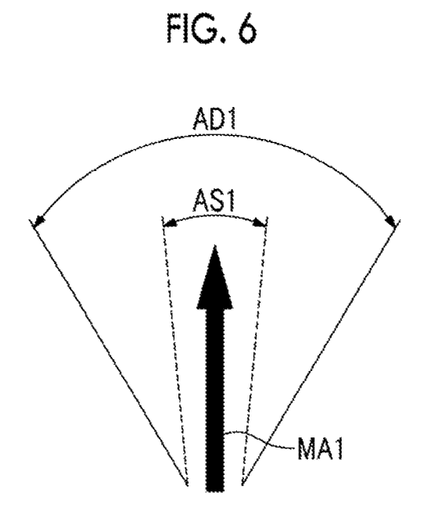
FIG. 6 is a diagram illustrating an example of a reference range and a determination range in an input device according to an embodiment of the present invention.
Figure 7A:
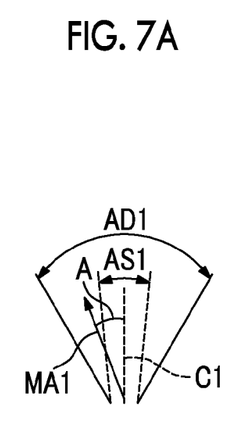
FIGS. 7A through 7H are diagrams illustrating trajectories of eight operations for a second determination shown on the reference range and the determination range illustrated in FIG. 6.
Figure 7B:
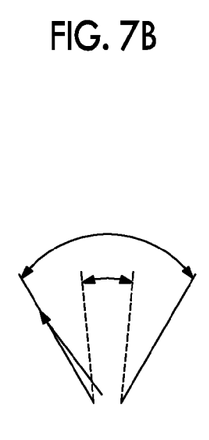
Figure 7C:
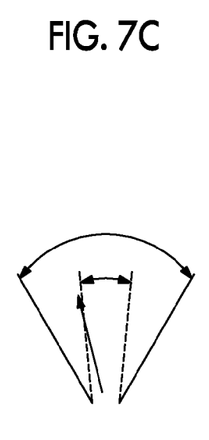
Figure 7D:
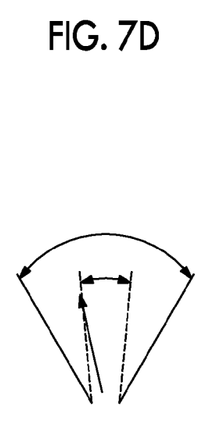
Figure 7E:
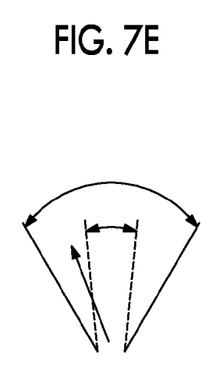
Figure 7F:
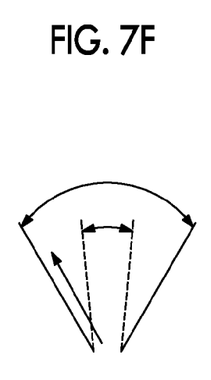
Figure 7G:
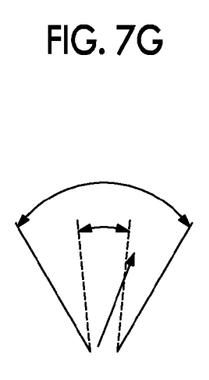
Figure 7H:
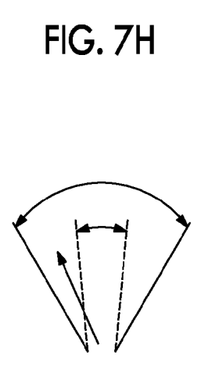
Figure 8:
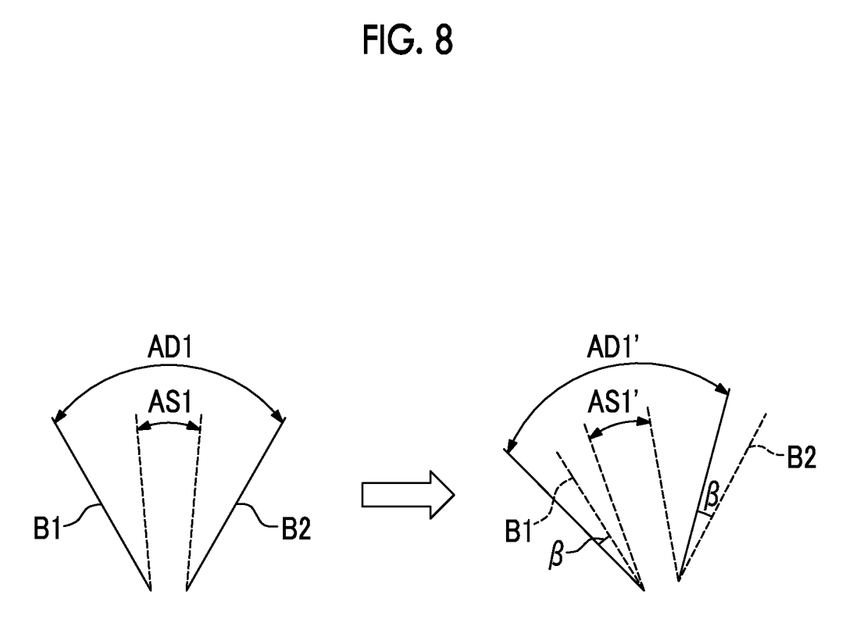
FIG. 8 is a diagram illustrating a state in which a reference range and a determination range illustrated in FIG. 6 are corrected based on eight operations illustrated in FIGS. 7A through 7H.

Next, the second determination will be described with reference to FIGS. 6 to 8. FIG. 6 is a diagram illustrating an example of the reference range AS1 and the determination range AD1 in the input device 10. FIGS. 7A through 7H are diagrams illustrating trajectories (A to H) of eight operations for the second determination shown on the reference range and the determination range illustrated in FIG. 6. FIG. 8 is a diagram illustrating a state in which the reference range AS1 and the determination range AD1 illustrated in FIG. 6 are corrected based on the eight operations illustrated in FIGS. 7A through 7H. In FIG. 7A, the trajectory of the operation of the operator is replaced with a straight line MA1 and displayed. This straight line MA1 is replaced with a straight line by connecting a start point and an end point of an arc-shaped trajectory, similarly to the straight line M2 illustrated in FIG. 5, box (b). Further, while the reference range and the determination range are integrally corrected in the example illustrated in FIG. 8, the determination range may not be corrected, and only the reference range may be corrected within the determination range.

The second determination is performed based on the trajectory of an operation performed on the touch pad 21 directly before or after an operation of the switch 22. In the second determination, when the trajectory of the operation of the operator is compared with the reference range, for example, the comparison with the trajectory of the operation is performed, similarly to the first determination, using one or both of the two boundary lines defining the angle of the reference range or a centerline dividing the reference range at the same angle as the determination line illustrated in FIG. 5, box (a).

In the example illustrated in FIGS. 7A through 7H, the determination is performed based on six operations other than a case in which a deviation angle of the trajectory of the operation of the operator with respect to the reference range is greatest (FIG. 7B) and a case in which the deviation angle is smallest (FIG. 7G) among eight operations shown in FIGS. 7A to 7H. In this case, the determination unit 50 calculates an angle A of a straight line MA1 with respect to a centerline C1 (FIG. 7A) of the reference range AS1 for each of the six operations, and calculates an average value of the angles. When this average value exceeds a predetermined angle, the determination unit 50 determines that the trajectory of the operation of the operator exceeds the reference range (second determination). In this case, the range setting unit 60 calculates an angle β (FIG. 8B) obtained by multiplying the average value of the angles by a predetermined coefficient smaller than 1 as a correction value, corrects the reference range AS1 and the determination range AD1 with a reference range AS1' and a determination range AD1' obtained by rotating the reference range AS1 and the determination range AD1 by the angle β around the origin O of the virtual coordinate, and updates the range data. In this case, two boundary lines of the determination range AD1' after correction are arranged in positions obtained by rotating the two boundary lines B1 and B2 of the determination range AD1 before correction by the angle β around the origin of the virtual coordinate, as illustrated in FIG. 8.

Further, while the determination has been performed on the eight operations in the example illustrated in FIGS. 7A through 7H, the number of operations that are determination targets is not limited to 8 as long as the number is 2 or greater.

While the determination according to the determination unit 50 has been described above, only the first determination and the second determination are sufficient as determination, and thus, it is not necessary to perform the determination process on all operations as in an operation device for a vehicle of the related art. Accordingly, it is possible to reduce a load on a system (the input unit 20, the storage unit 30, the control unit 40, the determination unit 50, and the range setting unit 60).

Further, the determination may include only one of the first determination and the second determination, and thus, it is possible to further reduce the load on the system. Here, the first determination is performed only for determination separate from a normal operation and the second determination uses the normal operation, and thus, when only the first determination is performed, it is possible to suppress an increase in the load on the system caused due to the second determination performed during the normal operation.

The first determination is not limited to being performed at the time of start-up of the input device 10 and may be performed after the start-up. It is preferable for the first determination to be performed at the time of start-up of the input device 10 or directly after the start-up because the trajectory is less likely to exceed the reference range and the determination range for subsequent operations and it is possible to reduce a load on the system related to the updating of the reference range and the determination range.

For the correction and the updating of the reference range and the determination range based on the determination result, only the reference range may be corrected and updated if the reference range after correction is within the determination range.

Further, the reference range and the determination range may be set to a range other than the range illustrated in FIG. 3 as long as the reference range is included within the determination range.

For example, the four determination ranges may not be the same angle ranges of the virtual coordinates or may not be symmetric to the coordinate axes. Further, while the centerlines match in the reference range and the determination range described above, both of the centerlines may not match as long as the reference range is included within the determination range. For example, the determination angle of AD1 may be 120° and the determination angle of AD2 may be 60°.

It is preferable for the range setting unit 60 to reset the reference range and the determination range in order to update the reference range and the determination range with the initial reference range and the initial determination range when there is no updating of the reference range over the predetermined time during start-up of the input device 10. This is because the operator is likely to change before a subsequent operation occurs or the trajectory of the operation is likely to be changed due to fatigue of the operator or the like when there is no operation over a long period time.

The reference range and the determination range associated with each operator, and the identification information (for example, an identification number or a name) for identifying the operator, for one person or a plurality of operators using the input device 10, may be stored in the storage unit 30. In this configuration, when a corresponding reference range and a corresponding determination range are read from the storage unit 30 according to the identification information of the operator designated by the operation of the switch 22 by the operator, and the reference range and the determination range are updated with data of the ranges, it is possible to simplify the determination and updating processes and reduce the load on the system. Here, it is preferable for "the reference range and the determination range" associated with each operator to be "a reference range and a determination range" set in last determination.

Due to the configuration described above, the following effects are achieved according to the above-described embodiment.

(1) Even when the trajectory drawn by the operation of the operator becomes arc-shaped due to a physical feature or a habit of the operator, a resultant different grip position on the steering wheel, or the like and exceeds a predetermined width, it is possible to correctly detect the operation of the operator by updating the reference range and the determination range according to the operation trajectory of the operator depending on the determination result.

(2) Since the first determination and the second determination are sufficient as the determination, determination of the reference range and the determination range is not performed for all operations, and a load on a determination process system is reduced.

(3) Since the determination is performed based on the linear determination line and trajectory as illustrated in FIGS. 5A through 5D, the system processing load can be reduced.

(4) Since the reference range and the determination range are highly likely to be updated with a reference range and a determination range according to the operator once or a small number of times, the updating process can be reduced and the load on the system is reduced.

The above-described input device 10 may be used as an operation device for a vehicle. In this case, in the input device 10, the range setting unit 60 updates the reference range based on the determination result of the determination unit 50, and outputs the control signal to the vehicle based on the identification result of the control unit based on the operation of the operator and the latest reference range, as described above. In the vehicle, a corresponding operation is performed according to the received control signal. For example, the input device 10 is arranged in the steering wheel or the console of the vehicle.

While the present invention has been described with reference to the above-described embodiments, the present invention is not limited to the above-described embodiments and improvements or changes are possible within the purpose of the improvements or the scope and the spirit of the present invention.

As described above, according to the input device and the operation device for a vehicle according to the present invention, it is possible to perform correct detection according to each operator even when the trajectory of the operation is different due to a physical feature of the operator, or the like.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
    an input unit having an input surface on which an input operation is performed by an operator with a finger coming into contact with or approaching the input surface, the input unit being configured to detect a trajectory of the input operation by a virtual coordinate system set on the input surface, the trajectory being formed by the finger's moving along the input surface in contact therewith or in close proximity thereto;
    a switch configured to be touched or pressed by the operator;
    a storage unit configured to store respective reference ranges for a plurality of gestures set on the virtual coordinate system, and a determination range broader than the reference range for at least some of the reference ranges;
    a control unit configured to identify a gesture indicated by the input operation of the operator based on the trajectory detected by the input unit and the reference ranges stored in the storage unit, one of the reference ranges corresponding to the identified gesture;
    a determination unit configured to determine whether the trajectory of the operation of the operator exceeds the reference range for the identified gesture corresponding to the trajectory;
    a determination unit configured to determine whether the trajectory of the input operation of the operator exceeds the reference range for the identified gesture corresponding to the trajectory; and
    a range setting unit configured to update the reference range for the identified gesture based on a determination result of the determination unit, and to set the updated reference range for the identified gesture in the storage unit, the control unit identifying the gesture corresponding to an input operation performed thereafter using the updated reference range stored in the storage unit,
    wherein the determination unit is further configured to perform a first determination at a start-up of the input device and a second determination for an input operation performed immediately before or after the switch is operated,
    wherein in the first determination:
        the control unit instructs the operator to perform a designated gesture by showing a first straight line as a first determination line such that the operator performs an input operation forming an intended trajectory for the designated gesture on the input surface;
        the determination unit determines if a first angle formed by a straight line corresponding to the intended trajectory with respect to the first determination line exceeds a first predetermined angle; and
        if the first angle exceeds the first predetermined angle, the range setting unit calculates a second angle smaller than the first angle, defines a second straight line by rotating the first determination line by the second angle with respect to an origin of the virtual coordinate system, and sets the second straight line as a second determination line, thereby updating the reference range for the identified gesture in the storage unit to the second angle from the second determination line,
    and wherein in the second determination:
        the control unit sets a center line within the reference range as a third determination line for a selected gesture;
        the determination unit determine whether a third angle formed by a straight line corresponding to a trajectory of the input operation for the selected gesture with respect to the third determination line exceeds a third predetermined angle; and
        if the third angle exceeds the third predetermined angle, the range setting unit calculates a fourth angle smaller than the third angle, and updates the reference range and the determination range for the selected gesture in the storage unit by rotating the reference range and the determination range by the fourth angle with respect to the origin.

2. The input device according to claim 1, wherein the range setting unit updates the reference range based on an average value of a predetermined number of input operations in the second determination.

3. The input device according to claim 1,
wherein the range setting unit resets the reference range and the determination range to an initial reference range and an initial determination range at a start-up of the input device.

4. The input device according to claim 1,
wherein the range setting unit resets the reference range and the determination range to an initial reference range and an initial determination range when there is no updating of the reference range over a predetermined period of time.

5. The input device according to claim 1, wherein
the storage unit stores a latest reference range and a latest determination range associated with each operator, and
the range setting unit reads the latest reference range and the latest determination range from the storage unit for a selected operator identified via an operation of the switch, so as to update the reference range and the determination range with the latest reference range and the latest determination range for the selected operator.

6. An operation device for a vehicle, comprising:
the input device according to claim 1 provided on a steering wheel or a console of the vehicle,
wherein the control unit is further configured to output a control signal to the vehicle based on the identification result.

7. The input device according to claim 1, wherein the input unit is configured to detect the trajectory based on a change in capacitance caused by the operator's coming into contact with or approaching the input surface.

8. The input device according to claim 1, wherein the input unit includes a touch pad.

9. The input device according to claim 1, wherein the gesture is identified as one of an upward gesture, a downward gesture, a rightward gesture, and a leftward gesture.

* * * * *